(12) United States Patent
Kofoed et al.

(10) Patent No.: US 7,009,978 B2
(45) Date of Patent: Mar. 7, 2006

(54) COMMUNICATIONS INTERFACE FOR PROVIDING A PLURALITY OF COMMUNICATION CHANNELS TO A SINGLE PORT ON A PROCESSOR

(75) Inventors: Sheldon J. Kofoed, Kanata (CA); Devon S. Lynch, Nepean (CA); Ingrid J. Zorgdrager, Kanata (CA)

(73) Assignee: Nortel Networks Limited, St. laurent (CA)

( * ) Notice: Subject to any disclaimer, the term of this patent is extended or adjusted under 35 U.S.C. 154(b) by 918 days.

(21) Appl. No.: 10/020,805

(22) Filed: Dec. 18, 2001

(65) Prior Publication Data

US 2003/0112819 A1    Jun. 19, 2003

(51) Int. Cl.
*H04L 12/56* (2006.01)
(52) U.S. Cl. ........................... 370/395.3; 370/389
(58) Field of Classification Search ............. 370/464, 370/360, 363, 368, 371, 374, 378, 381, 389, 370/392, 393, 397, 399, 395.3, 395.7, 411, 370/395.71, 412, 413, 419, 428, 429, 431
See application file for complete search history.

(56) References Cited

U.S. PATENT DOCUMENTS

| | | | |
|---|---|---|---|
| 5,794,061 A | 8/1998 | Hansen et al. | 395/800.01 |
| 6,188,699 B1 | 2/2001 | Lang et al. | 370/463 |
| 6,226,338 B1 | 5/2001 | Earnest | 375/372 |
| 6,237,029 B1 | 5/2001 | Master et al. | 709/217 |
| 6,498,794 B1 * | 12/2002 | Tsukamoto et al. | 370/395.1 |
| 6,775,706 B1 * | 8/2004 | Fukumoto et al. | 709/230 |
| 2002/0001311 A1 * | 1/2002 | Lizin | 370/392 |
| 2002/0054600 A1 * | 5/2002 | Tanaka et al. | 370/399 |

* cited by examiner

*Primary Examiner*—Brenda Pham
(74) *Attorney, Agent, or Firm*—Jeffrey M. Measures; Borden Lander Gervais LLP

(57) ABSTRACT

A communications interface on a data path between a plurality of data channels and a single communications port on a processor. The communications interface controls data as it passes on a receive path from the plurality of data channels to the single communications port and on a transmit path from the single communications port to the plurality of data channels and is adapted to use a memory to buffer the data when necessary. The communications interface (i) adds a channel identifier, which identifies to which data channel the data relates, to the data on the receive path so that the processor will be able to determine to which data channel the data relates and (ii) removes a channel identifier from the data on the transmit path so that the data will leave the communications interface in the same format in which it was received.

22 Claims, 3 Drawing Sheets

HDLC FRAME

| OPENING FLAG | ADDRESS | CONTROL | INFORMATION (OPTIONAL) | CRC | CLOSING FLAG |
|---|---|---|---|---|---|
| 8 BITS | 16 BITS | 8 BITS | 8(n) BITS | 16 BITS | 8 BITS |

FIG. 3A

CHANNEL-LABELED HDLC FRAME
**(IN COMMUNICATIONS INTERFACE *102*, RECEIVE PATH)**

| CHANNEL NUMBER | ADDRESS | CONTROL | INFORMATION (OPTIONAL) | CRC |
|---|---|---|---|---|
| 16 BITS | 16 BITS | 8 BITS | 8(n) BITS | 16 BITS |

FIG. 3B

**CHANNEL-LABELED HDLC FRAME (AT TCS MICROCONTROLLER *104*)**

| OPENING FLAG | CHANNEL NUMBER | ADDRESS | CONTROL | INFORMATION (OPTIONAL) | CRC | CLOSING FLAG |
|---|---|---|---|---|---|---|
| 8 BITS | 16 BITS | 16 BITS | 8 BITS | 8(n) BITS | 16 BITS | 8 BITS |

FIG. 3C

**HDLC FRAME (IN COMMUNICATIONS INTERFACE *102*, TRANSMIT PATH)**

| ADDRESS | CONTROL | INFORMATION (OPTIONAL) | CRC |
|---|---|---|---|
| 16 BITS | 8 BITS | 8(n) BITS | 16 BITS |

FIG. 3D

COMMUNICATIONS INTERFACE FOR PROVIDING A PLURALITY OF COMMUNICATION CHANNELS TO A SINGLE PORT ON A PROCESSOR

FIELD OF THE INVENTION

The present invention relates to a communication processing system and communications interface for providing a plurality of communication channels to a single port on a processor.

BACKGROUND OF THE INVENTION

In the field of telecommunications, there is a rapidly increasing requirement for a larger and larger number of communication channels. Current techniques allow a plurality of optical fibers to be provided to one circuit board. Each optical fiber can carry a plurality of communication channels. As more and more communication channels are created, there is also a requirement for these communication channels to be processed, analyzed, and routed. This processing, analysis and routing must generally be performed by a digital processor. Efficiencies can be achieved if a single processor processes a plurality of communication channels rather than having a dedicated processor for each channel.

Several attempts have been made to allow a single processor to handle a plurality of communications channels. For example, communication channel controller chips may be provided between the incoming communications channels and the single processor in order to regulate the flow of data, however this solution requires a large amount of circuit board space for the communication channel controllers. It also generally requires a system for bus arbitration and sharing of memory. This can result in a larger drain on the main processor.

Another attempted solution is to provide a slave processor to the main processor to handle some of the additional processing. This solution is difficult to implement and requires very difficult software programming.

Other solutions that have been proposed include either omitting or switching between communication channels. These solutions have the problem that Operations, Administration, Maintenance and Provisioning (OAM&P) information may then be missing for the communication channels that are omitted or that are active when the processor is working on a different channel.

One additional solution that has been attempted is to use time division multiplexing of the communication channels to provide separate channels in particular time slots sent to the processor. This solution has problems in that the communication channels may not be synchronous and is also limited in the number of channels that can be time division multiplexed together for processing by the processor. In particular, each processor is limited to some extent by its clocking frequency.

SUMMARY OF THE INVENTION

In accordance with an embodiment of the present invention, there is provided a communications interface on a data path between a plurality of data or communications channels and a single communications port on a processor. The communications interface controls data as it passes on a receive path from the plurality of data channels to the single communications port and on a transmit path from the single communications port to the plurality of data channels and is adapted to use a memory to buffer the data when necessary. The communications interface (i) adds a channel identifier, which identifies to which data channel the data relates, to the data on the receive path so that the processor will be able to determine to which data channel the data relates and (ii) removes a channel identifier from the data on the transmit path so that the data will leave the communications interface in the same format in which it was received.

In the above embodiment, since the channel number (channel identifier) is added to or embedded in the data itself, a large number of channels may be handled by a single processor without requiring complex circuitry or timing requirements such as is generally needed in conventional systems.

In accordance with an aspect of the present invention there is provided a communications interface including: a plurality of data ports for communicating with a plurality of data channels through which the communications interface receives and transmits data; a single processor port for communicating with a single communications port on a processor through which the communications interface receives and transmits data; a memory; an interface controller for controlling the data as it passes through the communications interface on a receive path from the plurality of data ports to the single processor port and on a transmit path from the single processor port to the plurality of data ports, the interface controller adapted to use the memory to buffer the data; and one or more channel identifier units adapted to, either individually or in combination, (i) add a channel identifier, which identifies to which data channel the data relates, to the data on the receive path, and (ii) remove a channel identifier from the data on the transmit path.

In particular, the channel identifier may be a unique designator assigned to each channel of the plurality of data channels. In a particular case, the interface controller and the channel identifier units may be a field programmable gate array. In another particular case, the memory may be divided into a plurality of memory blocks for each of the plurality of data channels and the interface controller may buffer the data in a memory block according to a data channel to which the data relates.

In accordance with another aspect of the present invention there is provided a communications interface including: a plurality of data ports for receiving data from a plurality of data channels; a single processor port for communicating with a single communications port on a processor; a memory; an interface controller for (i) storing data received by the data ports in the memory in predetermined memory blocks dependent upon the channel from which the received data is received, (ii) accessing the received data from the memory, and (iii) sending the received data to the single processor port on the processor; and a channel identifier insertion unit for adding a channel identifier to the received data prior to the received data leaving the single processor port.

In a particular case, the communications interface may further include a framer unit for parsing data received by any given data port into messages. In this case, the channel identifier insertion unit may be for adding a channel identifier into each of the messages. Further, each message may be enveloped by flags and the framer unit may also be for stripping the flags. For example, each message may be a High-level Data Link Control (HDLC) frame and the channel identifier insertion unit may add a channel identifier into a header of each HDLC frame. In a case where the message includes an error checking code, the channel identifier insertion unit may adjust the error checking code to account for the insertion of the channel identifier.

In another particular case, the interface controller may also be for receiving processed data, which includes a channel identifier, from the single processor port. In this case, the communications interface may further include a channel identifier removal unit for removing the channel identifier from the processed data and for communicating the channel identifier to the interface controller and the interface controller is also for (i) storing the processed data in the memory in a predetermined memory block dependent upon the channel identifier received from the channel identifier removal unit, (ii) accessing the processed data from the memory, and (iii) sending the processed data to a data port of the plurality of data ports dependent upon the memory block from which the processed data was accessed. In this particular case, the communications interface may further include a framer unit for parsing data received from the single processor port into messages and, in the case where the message includes an error checking code, the channel identifier removal unit may adjust the error checking code to account for the removal of the channel identifier.

In accordance with another aspect of the present invention there is provided a communications interface including: a single processor port for communicating with a single communications port on a processor and receiving data that includes a channel identifier; a plurality of data ports for communicating with a plurality of data channels; a memory; an interface controller for (i) storing data received by the processor port in the memory in predetermined memory blocks dependent upon the channel identifier, (ii) accessing the received data from the memory, and (iii) sending the received data to a data port of the plurality of data ports dependent upon the memory block from which the processed data was accessed; and a channel identifier removal unit for removing a channel identifier from the received data prior to the received data leaving the data port. In a particular case, the channel identifier removal unit may be adapted to remove the channel identifier prior to storing the data.

In accordance with another aspect of the present invention there is provided a communication processing system including a processor having a single communications port and a communications interface in communication with the single communications port on the processor. Here, the communications interface includes: a plurality of data ports for communicating with a plurality of data channels through which data is received and transmitted; a single processor port for communicating with the single communications port on the processor; a memory; an interface controller for controlling the data as it passes through the communications interface on a receive path from the plurality of data ports to the single processor port and on a transmit path from the single processor port to the plurality of data ports, the interface controller adapted to use the memory to buffer the data; and one or more channel identifier units adapted to, either individually or in combination, (i) add a channel identifier, which identifies to which data channel the data relates, to the data on the receive path, and (ii) remove a channel identifier from the data on the transmit path. In particular, the channel identifier may be a unique designator assigned to each data channel of the plurality of data channels.

In a particular case, the memory may be divided into a plurality of memory blocks for each of the plurality of data channels and the interface controller may buffer the data in a memory block according to a data channel to which the data relates.

In accordance with another aspect of the present invention there is provided a method for communicating data between a plurality of data channels and a single communications port on a processor. The method includes: buffering the data in a memory; adding a channel identifier, which identifies to which data channel the data relates, to the data on a receive path between the plurality of data channels and the single communications port; and removing a channel identifier from the data on a transmit path between the single processor port and the plurality of data channels.

In accordance with another aspect of the present invention there is provided a communications interface including: a plurality of data ports for communicating with a plurality of data channels; a plurality of channel identifier insertion units in communication with the plurality of data ports for receiving data and for adding a channel identifier into the data to provide channel-added data; a single processor port for communicating with a single communications port on a processor; a channel identifier removal unit in communication with the single processor port for receiving channel-added data from the single processor port and for removing a channel identifier from the data to provide transmit data; a memory divided into memory blocks for channel-added data and transmit data for each of the plurality of data channels; and an interface controller, in communication with: (a) the plurality of channel identifier insertion units, for (i) storing the channel-added data in the memory in predetermined memory blocks dependent upon the data channel from which the data was received, (ii) accessing the channel-added data from the memory, and (iii) sending the received data to the single processor port; and (b) the channel identifier removal unit, for (i) storing the transmit data in the memory in predetermined memory blocks dependent upon a channel identifier removed by the channel identifier removal unit, (ii) accessing the transmit data from the memory, and (iii) sending the transmit data to a data port of the plurality of data ports dependent upon the memory block from which the processed data was accessed.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3A illustrates a structure of a general high-level data link control (HDLC) frame;

FIG. 3B illustrates an example arrangement of the HDLC frame after insertion of a channel number label on a receive path;

FIG. 3C illustrates an example arrangement of the HDLC frame when handled by a processor; and FIG. 3D illustrates an example arrangement of the HDLC frame after removal of the channel number label on a transmit path.

DETAILED DESCRIPTION

Figure 1:
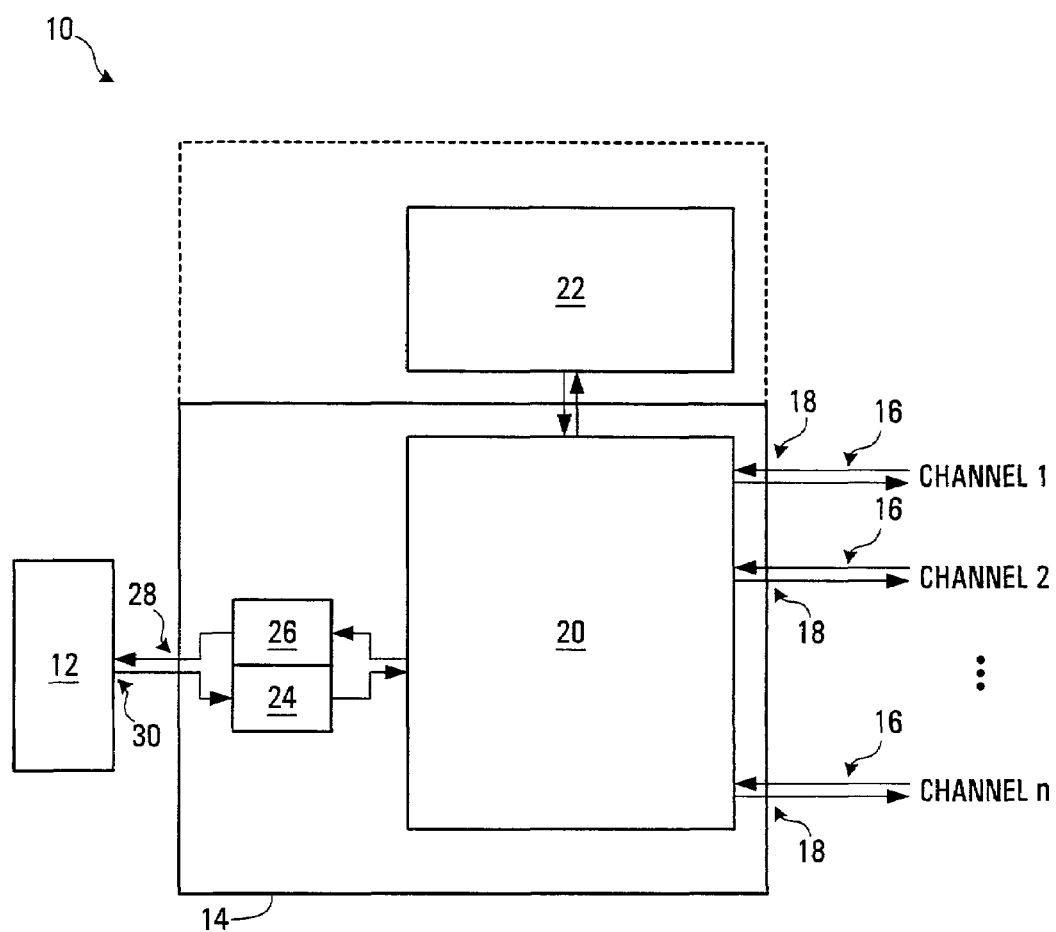
FIG. 1 is a schematic diagram of a communications processing system according to an embodiment of the invention.

FIG. 1 shows a communication processing system 10 according to an embodiment of the invention. The communication processing system 10 includes a main processor 12 and a communications interface 14. There are a plurality of communication channel data paths ("channels") 16 connected to the communication processing system 10. The channels 16 carry data streams which, on a receive path, pass through the communications interface 14 and are then sent to the main processor 12. Data streams also pass, on a transmit path, from the main processor 12 through the communications interface 14 and are transmitted on the channels 16. The communication processing system 10 is structured such that the single main processor 12 processes data from the plurality of channels 16.

The main processor 12 may be a conventional computer processor, a micro-controller, a custom processor, or the like and is configured to receive communications data and perform operations on received data or portions of received data and to also transmit or output communications data. The main processor 12 may be implemented on the same chip or circuit board as the communications interface 14 or may be separate and may also serve other purposes, such as, for example, as a general purpose computer or the like.

As will be understood, the channels 16 may be physical or logical channels and the data streams may include communications signals, communications data, control data, or other data that is to be sent for processing by the main processor.

The communications interface 14 includes a plurality of data ports 18 that correspond to the channels 16, an interface controller 20, an interface memory 22, a channel number insertion unit 24, a channel number removal unit 26, and a processor port 28 for communication with a single communications port 30 on the main processor 12.

The interface controller 20 controls the communications interface 14 and is connected to the interface memory 22 for the transfer of data. The interface memory 22 may be a part of the communications interface 14 or may be external to the communications interface 14 as shown by the dotted line in FIG. 1. Preferably, the interface memory 22 is subdivided into a plurality of memory blocks (not shown) with one memory block allocated for each receive path and transmit path of each channel 16 such that data streams originating from, or destined to, each channel 16 are always stored in separate blocks in the interface memory 22. Thus, the interface controller 20 can determine a direction, receive or transmit, and channel number for a particular data stream based on its location in the interface memory 22.

Both the channel number insertion unit 24 and the channel number removal unit 26 are provided between the interface controller 20 and the main processor 12. The channel number insertion unit 24 is provided on the receive path, which is a path between the incoming channels 16 and the main processor 12, while the channel number removal unit 26 is provided on a transmit path, which is a path between the main processor 12 and the outgoing channels 16. The channel number insertion unit 24 adds a channel number label into a data stream at a predetermined position, preferably near the beginning of the data stream. The channel number removal unit 26 removes a channel number label from a data stream.

In operation, a data stream enters the communication processing system 10 on a channel 16 and initially enters the communications interface 14 through a data port 18. The data stream passes to the interface controller 20 which begins storing the data stream in a predetermined memory block for receive data from the channel 16 in the interface memory 22. The interface controller 20 continues storing the data stream until a complete message is received. Once a complete message is received the interface controller 20 transmits the complete message from the interface memory 22 to the main processor 12. Prior to leaving the communications interface 14 through the processor port 28, a channel number label is added to the data stream (message) by the channel number insertion unit 24. The channel number label (or channel identifier) is a unique designator assigned for each of the channels 16. The main processor 12 then extracts the channel number label that was added to the message by the channel number insertion unit 24 in order to determine which channel 16 the message originated from.

In this description, it will be understood by one of skill in the art that the term "message" is used in a general way as a data stream having a beginning and an end and may include other data formats used in data communications such as data packets or the like.

The main processor 12 may also transmit messages, which may be new messages created for transmission or received messages that have been processed. If a transmit message is a new message, the main processor 12 will add a channel number label to the message to indicate the channel to which the message is destined. In the case of a received message that has been processed, the main processor may simply retain the existing channel number label as the indicator of the destination channel, or may substitute a new channel number label. The main processor 12 directs these messages through its single communications port 30 to the processor port 28 on the communication interface 14 as a data stream. The data stream first passes through the channel number removal unit 26, which removes the channel number label from the data stream. The "clear" data stream (that is, the data stream without a channel number label) is then stored by the interface controller 20 in the appropriate memory block for transmit data destined to that channel in the interface memory 22 until the entire message is received. After the entire message is received, the data stream is transmitted by the interface controller 20 through the appropriate data port 18 and onto the appropriate channel 16.

It will be understood by a person skilled in the art that the channel number insertion unit 24 and channel number removal unit 26 may also be placed at other locations within the communications interface 14 and may be placed either together or separately. For example, in an alternative embodiment, one channel number insertion unit 24 and one channel number removal unit 26 may be provided for each channel 16 and positioned between the interface controller 20 and the data ports 18 (incoming channels 16) rather than between the interface controller 20 and the processor port 28 (main processor 12). In such a case, the interface memory 22 may not need to have memory blocks allocated for each channel 16 since the channel number will remain in the data stream during storage.

It will also be understood that the channel number insertion unit 24 and channel number removal unit 26 may also perform other operations on the message. For example, checking a cyclical redundancy check (CRC) area in a message to ensure that a message is not corrupted and/or adjusting the CRC bits based on the addition or removal of the channel number label to the message.

In the above embodiment, since the channel number (or channel identifier) is added to or embedded in the data itself, a large number of channels may be handled by a single processor without requiring complex circuitry or timing elements that would generally be required to otherwise let the processor know to which channel a particular data stream relates.

Figure 2:
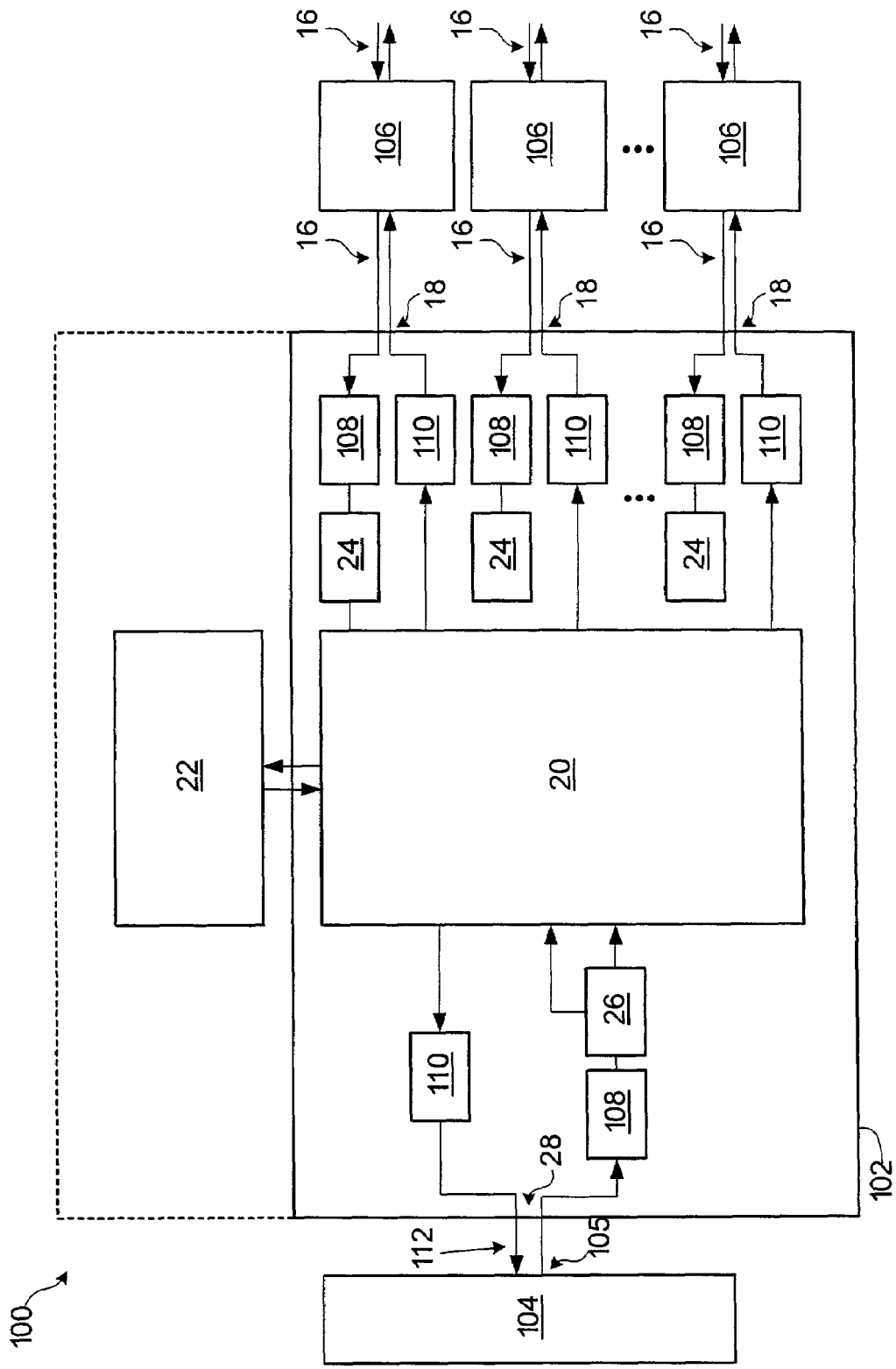
FIG. 2 is a schematic diagram of a communications interface according to another embodiment of the invention.

FIG. 2 illustrates a communication processing system 100 according to another embodiment of the invention. The communication processing system 100 is used in processing signals transmitted over optical fibers in accordance with the synchronous optical network (SONET) standard. In this embodiment, a communications interface 102 is provided on a data path between an integrated communications controller and microcontroller 104 and a plurality of channels 16. In particular, the communications interface 102 provides the functionality required for multiple data paths (channels 16) to be processed by a microcontroller 104 using only one communications input port 105.

In the following description, it may be useful to list several acronyms for reference as follows:

| | |
|---|---|
| CRC | Cyclical Redundancy Check |
| DCC | Data Communication Channel |
| FPGA | Field Programmable Gate Array |
| HDLC | High-level Data Link Control |
| MTU | Maximum Transmission Unit |
| OAM&P | Operations, Administration, Maintenance and Provisioning |
| OH | OverHead |
| SONET | Synchronous Optical Network |

Generally speaking, optical fiber is used to transmit data as light pulses. This data is generally organized into communication channels to allow a structured flow of data. The data transmitted on these communications channels is further generally organized into frames in accordance with the well known SONET standard. When an optical fiber reaches various points in a network such as network nodes, regeneration stations, or the like, the data may be converted from light pulses into electrical signals for further processing. Within the SONET frame there is a particular area allocated to overhead, that is, predetermined control codes and other information other than the payload data that is being transmitted, that must be extracted from the SONET frame in order to perform processing related to overhead, such as analysis for alarms or traffic, routing, and the like.

In particular, the data communication channel (DCC) portion of the SONET overhead is allocated for Operations, Administration, Maintenance and Provisioning (OAM&P) data that is used in network management and the like. Under the SONET standard, the DCC portion of the SONET frame is further divided into Line DCC data (9 bytes/SONET frame) and Section DCC data (3 bytes/SONET frame). Since the SONET standard provides for a transmission rate of 64 SONET frames per second, the transmission rate for Line DCC data is 576 kbps (9*64) and the transmission rate for Section DCC data is 176 kbps (3*64).

The DCC portion (either Line DCC or Section DCC) of the SONET frame may, itself, be provided in a frame format such as that specified for high-level data link control (HDLC). A general example of an HDLC frame is shown in FIG. 3A. Each HDLC frame includes an opening flag, a header (address and control sections), a data payload (or information) section, a CRC section (for error checking) and an ending flag. In the following description, an HDLC frame generally corresponds to a "message", as described in the embodiment above. Further, an HDLC frame may contain either Line DCC data or Section DCC data.

In this embodiment, SONET overhead processors 106, shown in FIG. 2, are provided on each channel 16 to extract or insert the DCC data (HDLC frames) from the overhead area of the SONET frame so that the DCC data may be extracted and sent to the communications interface 102 or inserted and transmitted with the SONET frame. In this embodiment, the overhead processors 106 may operate using a gaped clock or the like, as is generally known in the art, to transmit or receive the DCC data from the communications interface 102.

As the bytes of an HDLC frame are extracted from the SONET frame by the overhead processors 106, the bytes of the HDLC frame are sent to the communications interface 102. The communications interface 102 of FIG. 2 includes similar elements to those of the communications interface 14 of FIG. 1, described above, and, as such, similar elements will be described using similar reference numbers.

The communications interface 102 includes a plurality of data ports 18, an interface controller 20, an interface memory 22, a channel number removal unit 26, a plurality of channel number insertion units 24 a processor port 28, and further includes a plurality of HDLC extractor units 108 and a plurality of HDLC framer units 110. In the communications interface 102, on the receive path, a data stream is received from the overhead processors 106 and first passes through an HDLC extractor unit 108, a channel number insertion unit 24 provided for each channel 16, through the interface controller 20 (and, where appropriate, interface memory 22), then through an HDLC framer unit 110 before being sent to the microcontroller 104. On the transmit path, a data stream is received from the controller 104 and passes through an HDLC extractor unit 108, the channel number removal unit 26, through the interface controller 20 (and, where appropriate, interface memory 22), and then through an HDLC framer unit 110 provided for each channel 16 prior to transmission on the appropriate channel 16 and thus to an overhead processor 106.

A general description of the operation of the communications interface 102 follows and further details are provided below.

On the receive path, when the HDLC frame enters the communications interface 102 through a data port 18, the HDLC extractor unit 108 first removes the opening flag and closing flag from the HDLC frame so that the amount of data handled within the communications interface 102 is reduced. A channel number label is then added to a predetermined location in each HDLC frame, for example, the header of each HDLC frame, by the channel number insertion unit 24 so that the microcontroller 104 will be able to distinguish the channel from which each HDLC frame originated. An example of an HDLC frame with flags removed and a channel number label added is shown in FIG. 3B ("Channel-labeled HDLC frame"). The HDLC frame is buffered in the interface memory 22 before being passed to the HDLC framer unit 110, where the opening flag and the closing flag are added to the HDLC frame. Since each HDLC frame includes CRC data for error checking purposes, before being sent to the microcontroller 104 through the processor port 28, the CRC data is recalculated and modified in the HDLC framer unit 110 because the HDLC frame has been modified by the addition of the channel number in the HDLC header. An example of a channel-labeled HDLC frame in the form in which it is sent to the microcontroller 104 is shown in FIG. 3C.

Note that the term "HDLC frame" is used in different contexts to refer to each of the HDLC frame as it is received at the communications interface 102 (i.e. with opening flag and closing flag), to the HDLC frame as it is handled within the communications interface 102 (i.e. with channel number label and without opening flag and closing flag), and to the HDLC frame as it is sent to the microcontroller 104 (i.e. with channel number label and with opening and closing flags), among other arrangements, however the nature of the frame will be apparent from the context.

In the transmit path, a channel number label is included in each HDLC frame by the microcontroller 104 so that the communications interface 102 will be able to distinguish a destination channel 16 for each HDLC frame. As a data stream of an HDLC frame enters the communications interface 102 through the processor port 28, the HDLC extractor unit 108 first removes the opening flag and closing flag. Next, the channel number label is removed by the channel number removal unit 26. An example of an HDLC frame in this form is shown in FIG. 3D. Each HDLC frame is then buffered in interface memory 22 before being passed to the HDLC framer unit 110, where the opening flag and the closing flag are added to the HDLC frame for transmission. As above, prior to passing to the channels 16 through data ports 18, the CRC must be recalculated by the HDLC framer unit 110 because the channel number has been removed. When transmitted on channel 16, the HDLC frame has a form such as that shown in FIG. 3A.

From the foregoing, it will be apparent that the channel number label is used both to indicated which channel 16 an HDLC frame is from on the receive path and to indicated to which channel 16 an HDLC frame is destined on the transmit path.

The details of the communications interface 102 of this embodiment are now described.

In this embodiment, the interface memory 22 is subdivided into a plurality of memory blocks (not shown) each corresponding to receive and transmit paths of a predetermined channel 16 such that HDLC frames for each channel 16 in a given direction are always stored in the same memory block in the interface memory 22. Thus, the interface controller 20 can determine a direction and a channel number for a particular HDLC frame based on its location in the interface memory 22.

As described above, the receive path is defined as the path of the DCC data (HDLC frames) received from the channel 16 as it travels to the microcontroller 104 via the communications interface 102.

After the DCC data is extracted from the SONET frame by the overhead processor 106, it is sent to the communications interface 102 via a data port 18 and enters the HDLC extractor unit 108. The HDLC extractor unit 108 re-times the data stream to the system clock and monitors the incoming data stream for the opening and closing flags for an HDLC frame (that is, parses the data to extract messages). In a particular case, the HDLC extractor unit 108 may be set to accept one or more flags between received HDLC frames. On receiving an HDLC frame, the HDLC extractor unit 108 removes the opening flag, performs zero bit deletion on the data between flags, and removes the closing flag. In this embodiment, it is preferable to remove and not use opening and closing flags or idle bits inside the communications interface 102. These flags and bits can then be reinserted at the HDLC framer unit 110 prior to an HDLC frame leaving the communications interface 102. The opening flag and closing flag are elements that are common to all HDLC frames and can be easily removed from and added to an HDLC frame. This arrangement requires less memory and allows a faster flow of data within the communications interface 102.

In order to monitor the HDLC frames, the HDLC extractor unit 108 may perform a CRC check or other tests on the HDLC frames. For example, as shown in FIG. 3A, a 16-bit CRC may be provided in the HDLC frame. If a CRC error is detected, the HDLC frame may be counted and dumped so that corrupted HDLC frames will not be sent to the microcontroller 104. In a particular case, the HDLC extractor unit 108 may also dump runt or oversized HDLC frames. In this case, a counter may be provided on a per channel or port basis to keep track of the number of dumped HDLC frames.

Next, in order to identify from which channel 16 a particular HDLC frame originated, a channel number label is inserted into the header of the HDLC frame by the channel number insertion unit 24. FIG. 3B shows an example arrangement of the HDLC frame after insertion of the channel number label. The channel number label indicates which channel 16 the HDLC frame originated from in the receive direction (or which channel 16 the HDLC frame is to be routed to in the transmit direction, as described below). In the case shown in FIG. 3B, the channel number label is sixteen bits, which allows for $2^{16}$ (=65,536) channels 16 to be uniquely identified.

The role of the interface controller 20 on the receive path is to buffer the channel-labeled HDLC frames in the interface memory 22 and then pull completed HDLC frames out of the interface memory 22 to present to the microcontroller 104. Once a complete HDLC frame is buffered, a message descriptor or pointer can be used to mark the start and end of that HDLC frame in the interface memory 22. The interface controller 20 keeps track of the complete HDLC frames buffered in the interface memory 22 by, for example, using a series of message descriptor pointers or the like. Also, a round robin method can be used for moving received HDLC frames out of the interface memory 22. Prior to being sent to the microcontroller 104, the HDLC frames pulled out of the interface memory 22 are first sent to the HDLC framer unit 110.

The HDLC framer unit 110 monitors for HDLC frames and when no HDLC frames are available for transfer, an idle code, such as FF hex, can be sent to the microcontroller 104. Once an HDLC frame is available, the HDLC framer unit 110 sends an opening flag, followed by the HDLC frame contents, including the channel number label, and finally the closing flag. In this process, zero bit stuffing is performed on the data between flags as the data is sent out to ensure that there are not too many consecutive ones in the HDLC frame. In between back to back HDLC frames there will be two similar bytes (for example, 7E Hex) representing the closing flag of the first HDLC frame and the opening flag of the second HDLC frame. It may also be possible to provide for a programmable value of the idle bytes in between HDLC frames. The HDLC framer unit 110 also updates the CRC data to allow for the addition of the channel number label. The new CRC data value may be written over the old CRC data value. FIG. 3C shows an example HDLC frame as it is sent to and handled by the microcontroller.

The microcontroller 104 receives the HDLC frame from the processor port 28 and identifies the channel that it came from by the channel number label prior to processing the frame. The microcontroller 104 may process the frame to, for example, select a new destination channel for the frame and transmit it or perform a function based on the data in the frame.

The transmit path is defined as the path of the DCC data transmitted by the microcontroller 104 via the communications interface 102 to a communications channel 16.

When coming from the microcontroller 104, the HDLC frame has a channel number label included in its header that indicates which channel 16 the HDLC frame is to be sent over. For a frame that has been processed, the channel number label may be the same as the label for the HDLC frame when it was sent to the microcontroller 104, or it may be a new label substituted by the microcontroller 104. Upon entering the communications interface 102 through the processor port 28, a data stream from the microcontroller 104 enters the HDLC extractor unit 108. The HDLC extractor unit 108 re-times the data stream to the system clock and monitors the incoming data stream for the opening and closing flags for an HDLC frame. The HDLC extractor unit 108 may also accept one or more flags in between received HDLC frames. As above, the HDLC extractor unit 108 removes opening and closing flags and performs zero bit deletion to reduce the amount of data handled within the communications interface 102. The HDLC extractor unit 108 may also perform a CRC check. If a CRC error is detected, the HDLC frame may be counted and discarded since it may not be clear where to send the HDLC frame as the address may have been corrupted. Again, in a particular case, the HDLC extractor unit 108 will generally dump runt or oversized HDLC frames. In this case, a counter may be provided on a per channel or port basis to keep track of the number of dumped HDLC frames.

Since each channel 16 has a dedicated portion of the interface memory 22 assigned for storage of HDLC frames, the channel number label may also be removed from an HDLC frame before storing it in the interface memory 22. The channel number label is removed from the HDLC frame by the channel number removal unit 26 and the HDLC frame is sent by the interface controller 20 to the corresponding channel's transmit block of the interface memory 22. FIG. 3D shows an example HDLC frame after removal of the channel number label on the transmit path.

The role of the interface controller 20 on the transmit path is to buffer the HDLC frames from the microcontroller 104 in the interface memory 22 and then pull completed HDLC frames out of the interface memory 22 to present to each channel 16 (and its associated overhead processor 106). Once a complete HDLC frame is buffered, a message descriptor marks the start and end points of that HDLC frame in the interface memory 22. The interface controller 20 keeps track of the complete HDLC frames buffered in the interface memory 22. Prior to being sent to the appropriate channel 16, the HDLC frames pulled out of the interface memory 22 are presented to an HDLC framer unit 110 for the channel 16.

The HDLC framer unit 110 monitors for HDLC frames and when no HDLC frames are available for transfer, a programmable idle code may be sent to the channel 16 Once an HDLC frame is available, the opening flag is sent first, followed by the HDLC frame contents and finally the closing flag is sent. In this process, zero bit stuffing is performed on the data between flags as the data is sent out to ensure that there are not too many consecutive ones in the HDLC frame. In between back to back HDLC frames there will be two similar bytes (for example, 7E Hex), the first being the closing flag of the first HDLC frame and the second being the opening flag of the second HDLC frame. The HDLC framer unit 110 also updates the CRC data for the HDLC frame since the channel number label has been removed.

The HDLC frame is then transmitted through the appropriate data port 18 on to the appropriate channel 16 where it is processed by the overhead processor 106, which inserts the HDLC frame (DCC data) into the appropriate place in the SONET frame by a method known in the art, such as a gaped clock (not shown) or the like.

In the above embodiment, modifications will be apparent to one of skill in the art. For example, the functions carried out by the HDLC extractor unit 108 and the channel number insertion unit 24 may be combined. Similarly, the functions carried out by HDLC framer unit 108 and the channel number removal unit 26 may be combined. Also, the HDLC extractor unit 108, the channel number insertion unit 24, the HDLC framer unit 108, and the channel number removal unit 26 may be positioned in other appropriate locations on the receive and transmit paths. Further, the interface memory 22 may be either internal or external to the communications interface 102 as shown by the dotted line in FIG. 2, or may be combined with the interface controller 18.

The following description describes an illustrative example of a particular arrangement according to the embodiment shown in FIG. 2. In this example, there are four channels 16 and the communications interface 102 is implemented by a field programmable gate array (FPGA).

The structure of the FPGA can be determined by considering the requirements of the communications interface 102. For example, due to the nature of SONET data, the DCC data (HDLC frames) may be received and transmitted at the same time on each channel 16. Thus, with a single interface memory 22 it is necessary to use a buffering method such as first-in first-out (FIFO) memory to store the incoming data until it can be processed and stored in the interface memory 22. A buffering method is also required in order to ensure that data is available for transmission at the moment that the overhead processor 106 requests it. Therefore, to implement the buffering in this example, a minimum of 8 blocks of memory are required (for example, 1 FIFO memory for each channel 16 in the receive and transmit paths).

In particular situations, because of its programmability, the FPGA may also provide further functionality to the communications interface 102. For example, the FPGA may also support two modes of operation, a passthrough mode when DCC multiplexing is not required and a multiplexing mode such as that described in the embodiment above, in which HDLC frames are buffered. In passthrough mode, a selected DCC channel may be mapped directly to the output of the FPGA without any internal processing. In this mode, the interface memory 22 is not used. Additional functionality can be added to the FPGA by increasing the number of input/output ports and programming accordingly. For programming purposes, communications with the FPGA may be provided by a register interface (not shown), which will allow access to the FPGA registers. The register interface allows the microcontroller 104 or some external processor (not shown) to control the operations of the FPGA, including settings such as reset, pass through versus buffering mode, and the like.

In the above embodiments, the interface memory 22 is used to store incoming and outgoing HDLC frames and must be designed to handle the necessary volume of data to provide appropriate buffering. Carrying on with the illustrative example, the data path between the communications interface 102 and the microcontroller 104 may be an HDLC link 112 running at, for example, 8.25 MHz and an external interface memory 22 of SRAM structure may be used to simplify the communications interface 102 design. In determining memory size, there are two important parameters: buffer size and flow control.

First, on the receive path, the rate of the microcontroller 104 and the HDLC link 112 can be set to be faster than the rate of the incoming HDLC frames on the channels 16 so that on the receive path, only a small amount of data needs to be buffered to ensure that all received HDLC frames are sent to the microcontroller 104 and not dropped.

When considering the rate of data flowing through the communications interface 102, it is important to take into account the additional two bytes of data that are added for the channel number label. The maximum aggregate data rate, which is the rate at which data which must flow to the microcontroller 104, can be determined by considering a worst case scenario in which minimum size HDLC frames are being sent. In this case, the HDLC frame will have only one data byte, giving a total of seven bytes for the HDLC frame, however, because the channel label is added to the data, the size of each HDLC frame is increased by two bytes. Thus, the maximum data rate for each channel in this embodiment is given as:

Maximum aggregate data rate=9/7*maximum channel rate*4 channels.

where the maximum channel rate is the maximum data rate on a channel 16 before reaching the communications interface 102. This is considered the worst case scenario because the addition of the two bytes creates the largest ratio (9/7) with respect to the HDLC frame size. For example, a larger HDLC frame having 10 data bytes would give a ratio of 19/17 which is less than the ratio 9/7. In the above equation, each channel has the same maximum channel rate, however it may also be possible that different channels will have a different maximum channel rate and the equation can be adjusted accordingly.

In the illustrative example, the four channels 16 entering the communications interface may include 2 channels operating at a maximum channel rate of 192 kbps (each representing, for example, Section DCC data from a SONET frame), and 2 channels operating at a maximum channel rate of 576 kbps (each representing, for example, Line DCC data from a SONET frame). Thus the maximum aggregate data rate is:

$$\text{Maximum aggregate data rate} = 9/7 * [(2*192 \text{ kbps}) + (2*576 \text{ kbps})]$$
$$= 1974.86 \text{ kbps}.$$

The microcontroller 104 and HDLC link 112 must operate at a minimum of the maximum data rate (input rate≧output rate). In the illustrative example, since the maximum aggregate data rate above is much lower than the data rate of the HDLC link 112 of 8.25 Mbps, only a small buffer size is needed. In this case, the amount of memory required to store the received data when a number n of channels are being serviced using a round robin approach is given by:

MemoryNeeded=(MTU+Overflow)*n where

Overflow=($L_A$*n+$L_S$*(n−1))*Max_Data_Rate and where:
MTU is the maximum length of a message;
LA is the latency time to acknowledge there is a message to send to the microcontroller 104;
LS is the latency time to start transmission of the message to the microcontroller 104;
Max_Data_Rate is the maximum rate of any one channel 16.

Here, the latency times will be dependant on the implementation method and processes used. However, in the illustrative example, it will be less than one MTU.

Based on the above, in the illustrative example, the minimum amount of memory required for storage of received HDLC frames will be slightly larger than one MTU since a full HDLC frame will be buffered before it is sent to the microcontroller 104 and memory space will be required so that storage of the next HDLC frame may begin while the previously stored HDLC frame is being sent to the microcontroller 104 and other channels are serviced. In this example, two MTUs may be used to buffer received HDLC frames to ensure that no HDLC frames are dropped. The MTU size is generally set at a predetermined size for a given network, and in the illustrative example, is set at 1500 bytes (or 1502 bytes after additon of the two bytes for the channel number label).

On the transmit path, because the microcontroller 104 can generally send HDLC frames much faster than the HDLC frames can be inserted into the SONET frames, a larger buffer is required for transmit HDLC frames. The amount of memory required will be a function of the MTU size and the number of HDLC frames that will be sent before the microcontroller 104 will seek an acknowledgment that the HDLC frames have actually been sent. As described above, the MTU size is set by the network while the number of HDLC frames that will be sent before the microcontroller 104 will seek an acknowledgment may be set by software or hardware within the communication processing system 100. In the illustrative example, seven MTUs is selected. Again, in order to ensure that no data is lost, an additional one MTU of memory space is allocated. Thus, on the transmit path, a minimum buffer size of eight MTUs is used, where, as described above, each MTU is 1500 bytes.

Based on the memory requirements described above, in the illustrative example, a 1 M bit memory configured as eight blocks of 128K bits per block may be used, providing 128K bytes of memory for each receive and transmit path of the four channels 16. In this case, the buffer size per channel 16 has been rounded up to the nearest power of two and an equal size memory block is provided for each of the receive and transmit directions in order to simplify memory addressing issues.

When considering flow control, there may be no need for flow control on the receive path since the rate of the communications interface 102 will generally be greater than the rate at which the HDLC frames can be written into the interface memory 22. Thus, there should never be an overflow situation. However, in a particular case, memory full interrupts for each channel 16 may be made available through a software interface. In this case, since it is not possible to pause the extraction of the communications data from the SONET frame even if there is an alarm, receive memory can be indicated as full when the number of unused memory bytes is zero.

One the transmit path, flow control may be handled by the microcontroller 104 seeking an acknowledgement before sending more than 7 HDLC frames, as described above. Alternatively or in addition, flow control on the transmit path may be implemented by the interface controller 20 on a per channel basis to avoid an overflow situation in the interface memory 22 allocated for the transmit HDLC frames. For example, a data register may be used to monitor the available memory for each channel 16, and act as a flow control mechanism for indicating to the microcontroller 104 how much memory is unused. The communications interface 102 may aid in the flow control by using an artificially low value (i.e. a maximum of 80% of total memory) when calculating the unused space. For example, unused memory=total mem*80%−used memory. The communications interface 102 may then further aid in the flow control by generating a memory fill indication per channel. A transmit memory full interrupt may be asserted if the unused memory is less than, for example, 3000 bytes (two MTUs). This is done to ensure the current HDLC frame being transferred will not be lost. Therefore, before sending an HDLC frame to a channel 16 the microcontroller 104 may check the transmit memory full interrupt for that channel. Note that a register indicating the unused memory is not required since an interrupt will be generated when there are less than 3000 bytes of available memory. Further, the interrupt will be sent to the microcontroller 104 instead of requiring the microcontroller 104 to poll for this status.

The communications interface 102 according to the above embodiment provides advantages over conventional systems. For example, it allows multiplexing of a larger number of channels 16 on the receive path into a single serial stream than other multiplexing methods, such as time division multiplexing, and it is less complex and requires fewer I/O ports than communications interfaces using multiple processors or using other methods of channel number identification.

Other modifications will be apparent to those skilled in the art and, therefore, the invention is defined in the claims.

We claim:

1. A communications interface comprising:
    a plurality of data ports for communicating with a plurality of data channels through which said communications interface receives and transmits data;
    a single processor port for communicating with a single communications port on a processor through which said communications interface receives and transmits data;
    a memory;
    an interface controller for controlling said data as it passes through said communications interface on a receive path from said plurality of data ports to said single processor port and on a transmit path from said single processor port to said plurality of data ports, said interface controller adapted to use said memory to buffer said data; and
    one or more channel identifier units adapted to, either individually or in combination, (i) add a channel identifier, which identifies to which data channel said data relates, to said data on said receive path, and (ii) remove a channel identifier from said data on said transmit path.

2. The communications interface according to claim 1, wherein said channel identifier comprises a unique designator assigned to each channel of said plurality of data channels.

3. The communications interface according to claim 1, wherein said interface controller and said one or more channel identifier units comprise a field programmable gate array.

4. The communications interface according to claim 1, wherein said memory is divided into a plurality of memory blocks for each of said plurality of data channels and wherein said interface controller buffers said data in a memory block according to a data channel to which said data relates.

5. A communications interface comprising:
    a plurality of data ports for receiving data from a plurality of data channels;
    a single processor port for communicating with a single communications port on a processor;
    a memory;
    an interface controller for (i) storing data received by said data ports in said memory in predetermined memory blocks dependent upon the channel from which said received data is received, (ii) accessing said received data from said memory, and (iii) sending said received data to said single processor port on said processor; and
    a channel identifier insertion unit for adding a channel identifier to said received data prior to said received data leaving said single processor port.

6. The communications interface according to claim 5, further comprising a framer unit for parsing data received by any given data port into messages.

7. The communications interface according to claim 6, wherein said channel identifier insertion unit is for adding a channel identifier into each of said messages.

8. The communications interface according to claim 6, wherein each said message is enveloped by flags and wherein said framer unit is also for stripping said flags.

9. The communications interface according to claim 6, wherein each said message is a High-level Data Link Control (HDLC) frame and said channel identifier insertion unit is for adding a channel identifier into a header of each said HDLC frame.

10. The communications interface according to claim 6, wherein said message includes an error checking code and said channel identifier insertion unit adjusts said error checking code to account for the insertion of the channel identifier.

11. The communications interface according to claim 5, wherein said channel identifier comprises a unique designator assigned to each data channel of said plurality of data channels.

12. The communications interface according to claim 5, wherein said interface controller is also for receiving processed data from said single processor port, said processed data including a channel identifier, and said communications interface further comprising:
    a channel identifier removal unit communicating with said interface controller for removing said channel identifier from said processed data and for communicating said channel identifier to said interface controller,
    and wherein said interface controller is also for (i) storing said processed data in said memory in a predetermined memory block dependent upon said channel identifier received from said channel identifier removal unit, (ii) accessing said processed data from said memory, and (iii) sending said processed data to a data port of said plurality of data ports dependent upon the memory block from which said processed data was accessed.

13. The communications interface according to claim 12, further comprising a framer unit for parsing data received from said single processor port into messages.

14. The communications interface according to claim 13, wherein said message includes an error checking code and said channel identifier removal unit adjusts said error checking code to account for the removal of the channel identifier.

15. A communications interface comprising:
    a single processor port for communicating with a single communications port on a processor and receiving data that includes a channel identifier;
    a plurality of data ports for communicating with a plurality of data channels;
    a memory;
    an interface controller for (i) storing data received by said processor port in said memory in predetermined memory blocks dependent upon the channel identifier, (ii) accessing said received data from said memory, and (iii) sending said received data to a data port of said plurality of data ports dependent upon the memory block from which said processed data was accessed; and a channel identifier removal unit for removing a channel identifier from said received data prior to said received data leaving said data port.

16. The communications interface according to claim 15, wherein said channel identifier removal unit is adapted to remove said channel identifier prior to said storing said data.

17. A communication processing system comprising:
a processor having a single communications port; and
a communications interface in communication with said single communications port on said processor, said communications interface comprising:
  a plurality of data ports for communicating with a plurality of data channels through which data is received and transmitted;
  a single processor port for communicating with said single communications port on said processor;
  a memory;
  an interface controller for controlling said data as it passes through said communications interface on a receive path from said plurality of data ports to said single processor port and on a transmit path from said single processor port to said plurality of data ports, said interface controller adapted to use said memory to buffer said data; and
  one or more channel identifier units adapted to, either individually or in combination, (i) add a channel identifier, which identifies to which data channel said data relates, to said data on said receive path, and (ii) remove a channel identifier from said data on said transmit path.

18. The communications interface according to claim 17, wherein said channel identifier comprises a unique designator assigned to each data channel of said plurality of data channels.

19. The communications interface according to claim 17, wherein said memory is divided into a plurality of memory blocks for each of said plurality of data channels and wherein said interface controller buffers said data in a memory block according to a data channel to which said data relates.

20. A communications interface comprising:
a plurality of data ports for communicating with a plurality of data channels through which said communications interface receives and transmits data;
a single processor port for communicating with a single communications port on a processor through which said communications interface receives and transmits data;
a memory;
interface controller means for controlling said data as it passes through said communications interface on a receive path from said plurality of data ports to said single processor port and on a transmit path from said single processor port to said plurality of data ports, said interface controller adapted to use said memory to buffer said data; and
channel identifier means for (i) adding a channel identifier, which identifies to which data channel said data relates, to said data on said receive path, and (ii) removing a channel identifier from said data on said transmit path.

21. A method for communicating data between a plurality of data channels and a single communications port on a processor, said method comprising:
buffering said data in a memory;
adding a channel identifier, which identifies to which data channel said data relates, to said data on a receive path between said plurality of data channels and said single communications port; and
removing a channel identifier from said data on a transmit path between said single processor port and said plurality of data channels.

22. A communications interface comprising:
a plurality of data ports for communicating with a plurality of data channels;
a plurality of channel identifier insertion units in communication with said plurality of data ports for receiving data and for adding a channel identifier into said data to provide channel-added data;
a single processor port for communicating with a single communications port on a processor;
a channel identifier removal unit in communication with said single processor port for receiving channel-added data from said single processor port and for removing a channel identifier from said data to provide transmit data;
a memory divided into memory blocks for channel-added data and transmit data for each of said plurality of data channels; and
an interface controller, in communication with:
  (a) said plurality of channel identifier insertion units, for (i) storing said channel-added data in said memory in predetermined memory blocks dependent upon the data channel from which the data was received, (ii) accessing said channel-added data from said memory, and (iii) sending said received data to said single processor port; and
  (b) said channel identifier removal unit, for (i) storing said transmit data in said memory in predetermined memory blocks dependent upon a channel identifier removed by said channel identifier removal unit, (ii) accessing said transmit data from said memory, and (iii) sending said transmit data to a data port of said plurality of data ports dependent upon the memory block from which said processed data was accessed.

* * * * *